Sept. 15, 1942.   F. W. WEST   2,296,129
MEAT TENDERER
Filed Nov. 30, 1940
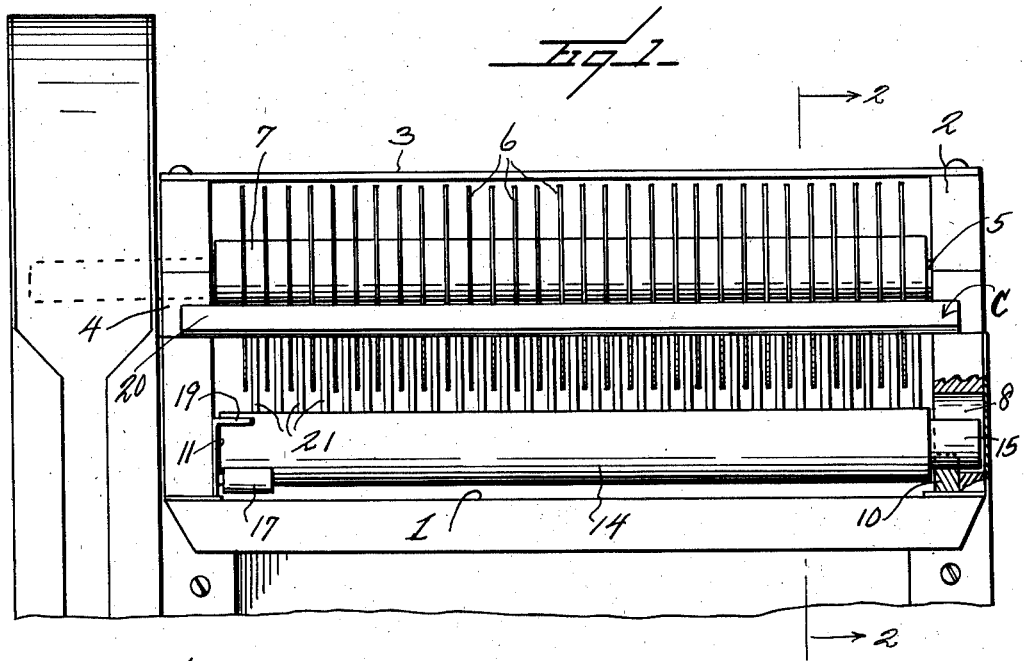
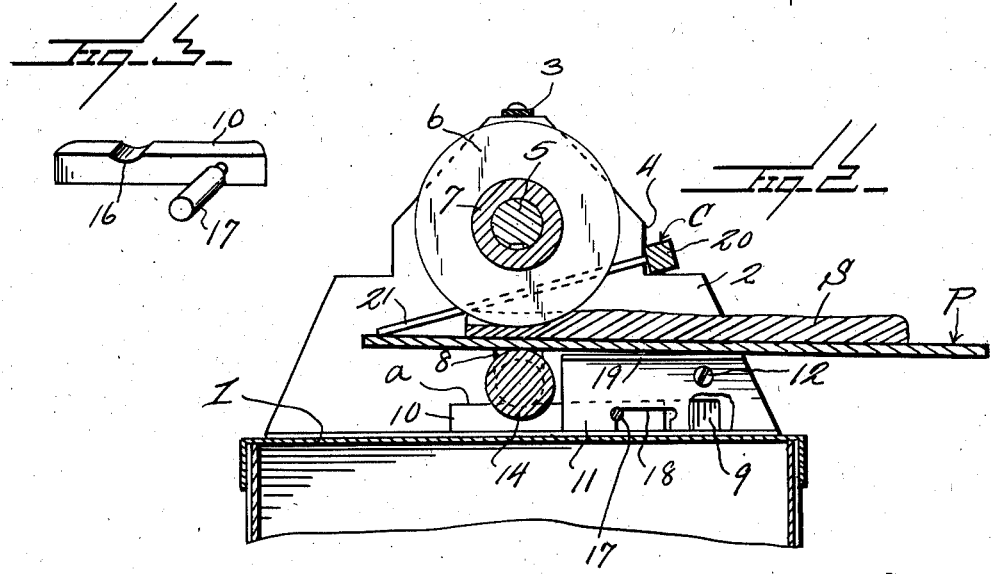
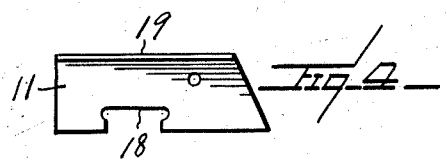
Inventor
Frank W. West
By Watson E. Coleman
Attorney Patented Sept. 15, 1942

2,296,129

UNITED STATES PATENT OFFICE 2,296,129

MEAT TENDERER

Frank W. West, Bellefonte, Pa.

Application November 30, 1940, Serial No. 368,078

1 Claim. (Cl. 17—27)

This invention relates to a meat tenderer, and it is an object of the invention to provide a device of this kind for cutting into a slice of meet and wherein the depth of the cuts may be varied.

It is also an object of thte invention to provide a device of this kind including a series of rotating knives having a roller positioned therebelow, a slice of meat passing between the knives and roller, the depth of the cuts of the knives being determined by the position of the roller with respect to the knives.

A further object of the invention is to provide a machine of this kind comprising a roller positioned below a series of spaced knives together with a cleaning element associated with said knives.

The invention consists in the details of construction and in the combination and arrangement of the several parts of my improved meat tenderer whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:

Figure 1 is a front elevational view of a meat tenderer constructed in accordance with an embodiment of my invention;

Figure 2 is a sectional view taken substantially on the line 2—2 of Figure 1;

Figure 3 is a view in perspective of a roller adjusting member unapplied;

Figure 4 is a view in front elevation of a holding plate for the adjusting member as herein embodied.

As disclosed in the accompanying drawing, 1 denotes a suitably supported shelf provided at its opposite end portions with the upstanding end pieces 2 of predetermined dimensions and design. In the present embodiment of my invention these end pieces 2 have their upper portions substantially in the form of an inverted V with their apices connected by a bracing strip 3. The sides of these end pieces 2 are also provided substantially midway the height thereof with the large recesses 4.

The upper portions of the end pieces 2 provide mountings for a shaft 5. This shaft 5 is rotated by any desired means and at a preferred speed. As the means for driving the shaft forms no part of the present invention a detailed illustration and description thereof are believed to be unnecessary.

Keyed or otherwise mounted upon this shaft 5 for rotation therewith is a gang of circular slitting knives 6. These knives 5 are equidistantly spaced along the shaft 5 and are maintained in desired spaced relation by the spacer sleeves 7 mounted upon and surrounding the shaft 5. One of said sleeves 7, as herein disclosed, is interposed between each pair of adjacent knives 6.

Each of the end pieces 2 directly below the shaft 5 is provided with a vertically directed slot 8 having its inner face open. The inner face of each of the end pieces 2 at its bottom is also provided with an elongated guide groove 9 at right angles to the adjacent slot 8. Slidably engaged within this guide groove 9 is an elongated roller adjusting member 10. This member 10 is of a length less than the groove 9 for a purpose to be hereinafter more particularly referred to. The member 10 is held within its groove 9 for sliding movement therealong by a holding plate 11. This plate 11 is removably held to the inner face of an end piece 2 by a screw 12 or the like. This member 10 is of a length to have its inner end terminating, when the plate 11 is in applied position, inwardly of but in close proximity to a slot 8 and with the lower portion of said member 10 substantially closing the outer face of the groove 9 along which it is disposed.

Substantially bridging the space between the end pieces 2 is a supporting roller 14. This roller 14 at each extremity is provided with an outwardly directed trunnion 15 which is freely engaged within a slot 8 of an adjacent end piece 2 and has contact from above and by gravity with the adjusting member 10. This member 10 in its upper surface is provided with the depression 16 which registers with the lower end portion of a slot 8 when the member 10 is at the limit of its movement in one direction as is particularly illustrated in Figure 2 of the drawing. With the member 10 in this position, the trunnion 15 will be received within the depression 16 but upon movement of the member 10 in the opposite direction, the trunnion 15 will be raised for engagement from above with the high top surface *a* of the member 10. It is, therefore, to be noted that upon operation of the member 10 the adjacent end portion of the roller 14 may be caused to raise or lower in accordance with the depth of the cuts or slits desired.

Each of the members 10 at one end portion carries an inwardly and substantially perpendicularly related operating member 17 which extends out through an elongated recess or slot 18 provided in the lower portion of the plate 11. This slot 18 is of a length to limit the extent of movement of the member 10 and particularly the movement thereof in a direction to raise the adjacent end portion of the roller 14.

The slice S of meat to be tenderized is placed upon a plate P of required dimensions. With the shaft 5 in rotation, the plate P and slice S thereon are pushed over the roller 14 with the plate P in direct contact with said roller. The knives 6 will slit the meat to a depth determined by the adjustment of the roller 14. As the plate P with the slice S thereon passes over the roller 14 and below the knives 6 no support for the plate P is imperative other than the roller 14. Of course, a hand of an operator grasps the plate P when said plate and the slice S thereon are guided to pass over the roller 14 and below the knives 6 and a hand of the operator will also grasp the forward end portion of the plate P after it has sufficiently passed beyond the roller 14 and the knives 6 to pull out the plate P and slice S.

In the present embodiment of the invention, a further means is shown for supporting the plate P as it moves forwardly over the roller 14. This means, as disclosed in the accompanying drawing, comprises an inwardly disposed flange 19 along the upper margin of each of the holding plates 11 and with which the plate P contacts from above as illustrated in Figure 2 of the drawing.

Coacting with the knives 6 is a cleaning comb C. As illustrated in the drawing, this comb C comprises an elongated straight back bar 20 of a length to have its end portions freely received within recesses 4 of the end pieces 2 at one side thereof. This bar 20 has extending therefrom the elongated straight cleaning fingers 21, one of which extends between each pair of adjacent knives 6 as is clearly illustrated in Figure 1 of the drawing. These fingers 21 serve to prevent any of the flesh being carried up with the knives 6 during a cutting operation and to otherwise maintain such knives clean. The fingers 21 will readily rise and fall as the plate P and slice S pass thereunder.

From the foregoing description it is thought to be obvious that a meat tenderer constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

In a meat slicing machine comprising a base member, upstanding end members mounted upon the base member and having opposite alined bearings adapted to receive a rotary shaft having a gang of circular knives thereon, the said end members having vertically directed slots therethrough directly below the bearings, a supporting roll having trunnions upon each end which are slidably mounted within the slots, the said end members also having horizontally directed guide grooves within their inner faces which are in communication with the vertical slots, elongated independent supporting roll adjusting slides slidably mounted within the guide grooves and carrying inwardly directed operating handles, and slide retaining plates secured to the inner faces of the end members, said retaining plates having elongated slots within their lower portions through which the operating handles of the slides extend and the top marginal edges of the retaining plates being provided with inwardly disposed supporting flanges, and a meat carrying plate resting upon the supporting roll and the inwardly disposed supporting flanges of the retaining plates.

FRANK W. WEST.